J. H. SPOHN, Jr.
DISPENSING APPARATUS FOR MIXING SIRUP AND WATER.
APPLICATION FILED JUNE 26, 1920.
1,435,883. Patented Nov. 14, 1922.
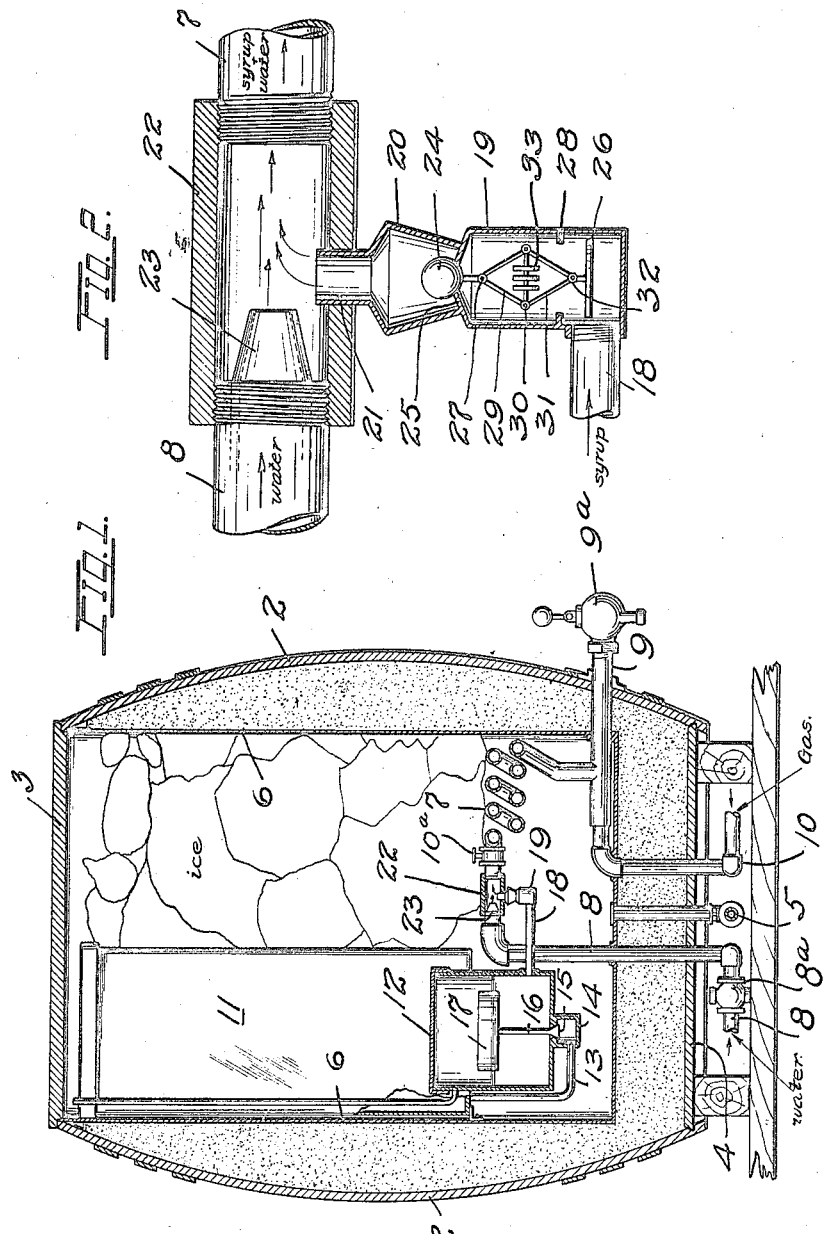
WITNESS
H.Q. Sherburne
INVENTOR
John H. Spohn Jr.
BY
White Prost & Evans
his ATTORNEYS Patented Nov. 14, 1922.

1,435,883

UNITED STATES PATENT OFFICE.

JOHN H. SPOHN, JR., OF SAN FRANCISCO, CALIFORNIA.

DISPENSING APPARATUS FOR MIXING SIRUP AND WATER.

Application filed June 26, 1920. Serial No. 391,853.

*To all whom it may concern:*

Be it known that I, JOHN H. SPOHN, Jr., a citizen of the United States, and a resident of the city and county of San Francisco and State of California, have invented a new and useful Dispensing Apparatus for Mixing Sirup and Water, of which the following is a specification.

This invention relates to fluid and gas mixing apparatus and more particularly relates to a dispensing apparatus for beverage.

In the dispensation of beverages, such for instance as root beer, it is the common practice to mix a sirup and water in suitable proportions and contain these in a receptacle or reservoir which may be cooled by suitable means and as the beverage is withdrawn from the receptacle it is carbonated by the addition of a suitable carbonating gas. In this system of dispensing the beverage when a quantity of the same has been mixed and introduced into the receptacle from which it is dispensed it is necessary to renew the supply in the receptacle very frequently in cases of constant demand for the beverage and this entails loss of time and generally unsatisfactory service.

It is one of the objects of the present invention to provide a dispensing apparatus whereby a predetermined amount of sirup will be automatically admitted to and mixed with water as it is drawn from an apparatus and therefore to eliminate the requirement of repeatedly refilling the receptacle with the previously mixed sirup and water.

A further object of the invention is to provide for the automatic addition of predetermined quantities of water and sirup and mixing therewith of a carbonating gas as the beverage is drawn from the apparatus and also to provide for the cooling of the beverage.

Another object of the present invention is to provide a carbonating beverage dispensing apparatus wherein there may be contained a conveniently large quantity or supply of sirup that will be automatically admitted to and mixed with water drawn into the apparatus and preferably from an ordinary hydrant or water-service supply system and to introduce into the mixed sirup and water a carbonating gas.

It is a further object of the invention to provide an automatic sirup and water mixing apparatus in which water is taken from a pressure supply system and is mixed with a supply of sirup which is automatically controlled in its quantity or proportion. And it is also in this connection an object of the invention to provide means for preventing water from the pressure from flowing into the sirup supply means.

A further object of the invention is to provide in a beverage dispensing apparatus means for automatically supplying a predetermined quantity of sirup to water as the latter flows through the apparatus and especially to provide for the addition of the desired quantity of sirup irrespective of the viscosity of the sirup due to temperature changes.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings:

Fig. 1 is a diagrammatic sectional and elevational view of a form of apparatus incorporating the invention.

Fig. 2 is a detail sectional view of a form of thermostatically operative valve for controlling the flow of sirup in accordance with its viscosity.

The common form of beverage dispensing apparatus includes generally a barrel or chest in which may be packed ice or in which there may be utilized any other cooling medium, and within the barrel there is a container or vessel that is charged periodically with a previously mixed quantity of sirup and water. As this beverage is drawn from the receptacle it is mixed with a carbonating gas. From this it will be seen that it is necessary to replenish the beverage as often and as rapidly as the supply tank is emptied.

The present invention consists of means for containing a supply of sirup and which means is connected to a water pipe directly connected to any water pressure system such, for instance, as the ordinary hydrant system, means being provided to admit a predetermined quantity of the sirup to flow into the water as the latter is drawn from the apparatus so that it is not necessary to so frequently replenish the latter since but a comparatively small portion of the contents of the sirup reservoir is drawn in the filling of a glass or other receiver placed at the outlet valve of the apparatus. In the preferred form of the invention a sirup tank is arranged in a cooling box, barrel, or chest through which there is passed a water pipe connected to a water pressure system and means are provided connecting the sirup tank to the water pipe for the control of the quantity of flow of sirup to the water.

The illustrated embodiment of the invention includes a barrel shaped receptacle 2 having a removable cover 3 at the top, and a bottom closure 4 that may be provided with a drain. In the barrel there is provided an ice-chest or box 6 in the lower portion of which is arranged a cooling means, such for instance, as a set of coil pipes 7 to the inlet end of which there is attached a pipe 8, connected to any suitable source of supply of water, preferably under pressure, as for instance in a hydrant or service system. The outlet of the coil 7 is shown as connected to a carbonator 9 in which the mixture passing from the coil 7 is further mixed with a carbonating gas as supplied from a suitable source connected to the carbonator 9 by a pipe 10.

For supplying sirup to the water passing through the supply pipe 8 and the cooling coil 7 to the carbonator, a sirup supply tank or other device is conveniently located with respect to the system and is preferably arranged within the keg 2 and is shown as mounted within the ice-chest 6. The sirup tank may be suitably formed and is shown as comprising a tank 11 arranged with its open upper end disposed adjacent to the cover 3 of the keg so that sirup may be conveniently admitted to the tank 11 as the supply is exhausted therefrom. Means for automatically supplying a predetermined ratio of the sirup to the water passing through the apparatus is incorporated and may be of any suitable form.

One form of sirup flow regulating means is shown as comprising a float chamber 12 arranged at the bottom of the tank 11 and connected thereto by a pipe 13 leading into a valve chamber in which there is operative a valve 15 attached to the lower end of an upwardly extending stem 16 having on its upper end a float 17. Leading from the float chamber 12 is an outlet pipe 18 attached to a valve structure including, for instance a shell 19 with an outlet portion 20, which in turn is provided with a nozzle 21, Fig. 2, leading into an ejecting device including a tubular casing 22. This device is connected at one end to the water supply pipe 8 and at its opposite end leads into the cooling coil 7, and therefore when the valve 9ª of the carbonator 9 is opened and water flows from the supply pipe 8 into the cooling coil 7 and thence through the carbonator, there is automatically drawn into the device 22, through the nozzle 21, a proportion of sirup that is predetermined by the aspirating effect through the valve device 19, its outlet 20, and the nozzle 21. This aspirating effect is also regulated and controlled by a nozzle 23, through which water from the pipe 8 passes at increased velocity across the mouth of the nozzle 21.

Since the water supply pipe is connected to a system preferably under pressure it is desirable to prevent back flow of the water to the sirup serving parts and to that end the valve structure 19—20 is of the automatic closing type and may include a check valve in the form of a ball 24 adapted to seat upon a complementary part 25 arranged for instance at the upper end of the chamber 19 and at the lower convergent portion of the part 20. Therefore as soon as the valve 9ª is opened, water is discharged at increased velocity from the nozzle 23 across the aperture of the nozzle 21 so that there will be a suction effect in the valve parts 19—20 to draw sirup through the pipe 18. As soon as the carbonator valve 9ª is closed again check valve 24 will automatically return to its seat as the upward pressure of the sirup is interrupted.

The valve is adapted to be opened upwardly from its seat 25 to a limited degree that may be determined, for instance, by a follower 26 attached to a downwardly extending stem structure 27 of the valve 24, such stop device being adapted to engage a top or shoulder 28 in the valve shell 19. The ejector parts and the valve structure associated therewith are designed to automatically provide the desired proportion of sirup to a given quantity of water according to the rate of flow of the latter through the apparatus when the main valve 9ª is open and so long as the viscosity of the sirup remains constant. But in the event of the change in the viscosity of the sirup, due to variation of temperature, it is desirable to automatically provide for an increased capacity of flow into the ejecting device and, conversely, to automatically return the capacity of flow to the normal as the viscosity again decreases. Therefore, means are provided for automatically varying the effective capacity of flow into the ejector and as here shown such means comprises a device for varying the effective length of the stem structure 27 between the valve 24 and the stop device 26 attached thereto. To that end there is shown attached to the lower end of the stem 27 an upper pair of links 29 which are pivoted at their outer ends 30 to the upper ends of a lower pair of links 31 which in turn are pivoted at 32 to the stop device 26. Interposed between the pivots 30 of the upper and lower sets of links 29 and 31 is a device readily variable by temperature changes and may comprise for instance a common form of thermostatic pile of disks 33 which, upon expanding due to increase of temperature acts to separate a pivot 30 and thus to relatively contract the connection between the valve 24 and its stop member 26, and conversely, upon a fall of temperature the thermostatic device 33 automatically retracts the pivots 30 or draws them toward each other and therefore lengthens the effective distance between the valve 24 and its stop device 26. Upon the conditions precedent of a predetermined temperature of the sirup flowing from the float chamber 12 and into the valve device 19 the thermostatic device 33 will be constructed and designed to maintain a valve 24 and its stop device 26 at its predetermined distance, so that when the valve 24 is lifted from its seat by the upward pressure of sirup coming through the connection 18 at a given viscosity of the sirup then a predetermined and desired volume of the sirup will be admitted to the ejector during the aspirating effect of the discharging water from the nozzle 23. Upon a decrement of temperature the thermostatic device 33 is adapted to contract and thus to increase the effective length of the stem connection so that when the stop device 26 is moved upwardly against complementary part 28 the valve 24 can ascend to a higher point in the tapering part of the shell 20 and therefore permit an increased capacity of flow of the denser sirup.

It will be seen that by providing means for regulating the flow of the sirup from the supply tank 11 to the point in the system where it is added to the water that a predetermined quantity of the sirup will be drawn in by the ejector effect of the flowing water as soon as the valve 9ª is open. The present automatic flow controlling device includes the float chamber 12 in which the float 17 operates to maintain a predetermined level of the sirup this level preferably being about in the mouth of the nozzle 21 of the ejector. As the stream of water projects in a jet across the mouth of the nozzle 21, sirup will be drawn through the supply connection 18, and as the level of the sirup in the float chamber 12 falls, the valve 15 will recede from its seat and a flow of additional sirup from the tank 11 will take place, the flow being automatically cut off as the level again rises and lifts the float 17 thus seating the valve 15.

From the above it will be seen that the invention provides for the automatic adding of a predetermined quantity of sirup into a stream of water flowing from a pressure supply system and enabling the use of the receptacle 2 as an ice-box in which may be arranged an ample supply of sirup in the tank 11. The entire apparatus is simple in construction and is compact in the arrangement of the parts and may be constructed as a self-contained unit and dispensing outfit requiring only to be attached to a water supply system and to a supply of carbonating gas.

Preferably the pipe 8 has a reducing valve 8ª so as to maintain a constant pressure at the nozzle 23 irrespective of variation in the main supply line. It is also desirable to prevent back pressure from the gas pipe 10 into the mixing device 22 and therefore a check valve 10ª is provided at the intake end of the coil.

What is claimed is:

1. A dispensing and carbonating apparatus for beverages, having a valved carbonator connected to a supply of carbonating gas, an ice receptacle having a cooling means connected to the said device and to a water-service pipe, a supply source of sirup in said receptacle and means for automatically regulating and supplying a flow of sirup from said source to said water-service pipe to mix with water drawn through the apparatus, said regulating means including a thermostatic device to vary the flow according to the temperature and viscosity of the sirup.

2. In a beverage dispensing apparatus, means for automatically adding sirup to water in given proportion and means automatically operative by temperature conditions to regulate the flow of the sirup.

3. In a beverage dispensing apparatus, means for automatically adding sirup to water in given quantities, including a valve device automatically operative to increase and decrease the port area as the viscosity of the sirup varies.

In testimony whereof, I have hereunto set my hand at San Francisco, California, this 14th day of June 1920.

JOHN H. SPOHN, Jr.

In presence of—
W. W. HEALEY.